United States Patent [19]
Hashimoto et al.

[11] Patent Number: 5,752,323
[45] Date of Patent: May 19, 1998

[54] VENTILATOR/DRYER ASSEMBLY USING MOISTURE ADSORBER

[75] Inventors: Masuyuki Hashimoto; Toshio Nakayama, both of Gunma-ken; Tatsuo Namatame, Tochigi-ken; Yasutomo Akutsu, Osaka-fu; Norio Abukawa, Osaka-fu; Yasuhiro Motoki, Osaka-fu; Akira Okada, Osaka-fu, all of Japan

[73] Assignee: Sanyo Electric Co., Ltd., Osaka-fu, Japan

[21] Appl. No.: 805,441

[22] Filed: Feb. 25, 1997

[51] Int. Cl.$^6$ ............................................. F26B 21/06
[52] U.S. Cl. .................. 34/80; 34/86; 62/94; 96/125
[58] Field of Search ........................... 34/72, 73, 75, 34/76, 77, 80, 86, 95, 604; 62/259.1, 49.3, 93, 94, 271, 272; 454/236; 95/10; 96/125, 143, 146, 147

[56] References Cited

U.S. PATENT DOCUMENTS

| | | | |
|---|---|---|---|
| 4,668,249 | 5/1987 | Purdue | 96/125 |
| 4,926,618 | 5/1990 | Ratliff | 95/10 |
| 5,147,420 | 9/1992 | Claesson | 96/125 |
| 5,183,098 | 2/1993 | Chagnot | 165/8 |
| 5,230,466 | 7/1993 | Moriya et al. | 62/94 |
| 5,373,704 | 12/1994 | McFadden | 62/94 |
| 5,572,799 | 11/1996 | Masuyuki et al. | 34/80 |

*Primary Examiner*—Henry A. Bennett
*Assistant Examiner*—Steve Gravini
*Attorney, Agent, or Firm*—Darby & Darby

[57] ABSTRACT

A compact and effective ventilator/drier assembly for heating the room to which it is installed has a case main body 1 divided into a primary zone 3A communicating with an air inlet port 2A, a tertiary zone 3C communicating with an air outlet port 2B and a secondary zone 3B disposed adjacent to the tertiary zone and the primary zone. Moist air A in a room 100 is forced to flow through the air inlet port, the primary zone, the secondary zone, the tertiary zone and the air outlet port and back into the room by a centrifugal type air blower 21 and moisture contained in the room air is adsorbed by a cylindrical rotary type moisture adsorbing device 31 arranged between the secondary zone and the tertiary zone as the air is made to come into contact with a moisture-removing portion 31A of the adsorbing device 31. Dried air B is moved to into the tertiary zone, where it is heated to produce heating air E, which is discharged from the air outlet port into the room. At the same time, the heat recovered by the heat recovering portion 31C of the rotary type moisture adsorbing device is utilized to heat regenerating air C, which is led to the tertiary zone by a drying/heating changeover damper 48 and then discharged from the air outlet port.

3 Claims, 15 Drawing Sheets

VENTILATOR/DRYER ASSEMBLY USING MOISTURE ADSORBER

BACKGROUND OF THE INVENTION

1. Field of the Invention

This invention relates to a ventilator/dryer assembly provided with a rotary drying device that can suitably be used for drying the inside of a highly humid and closed room such as a bathroom, a closet, a cellar, or the like, in a building.

2. Background Art

It is a common practice to provide a room in a house such as a bathroom with a vent arranged on the wall or the ceiling and fitted with a grille on the vent inner part and a ventilating fan on the outer part within the frame of the vent.

Alternatively, a room may be provided with an air outlet port and an air inlet port separately arranged on the wall or the ceiling so that wet air in the room is drawn out through the air outlet port by means of a ventilator/dryer assembly arranged outside the room for drying while dried air is blown into the room through the air inlet port. This arrangement is particularly effective for a bathroom or a laundry where washed wet cloths are hung for drying.

A conventional ventilator/dryer assembly of the type under consideration typically comprises a rotary drying device housed in a case main body and a forced air circulation mechanism that circulates air by drawing wet air from the room via the air outlet port, passing it through the rotary drying device for drying by adsorption of moisture and then blowing dried air back into the room via the air inlet port. At the same time, the moisture containing rotary drying device is supplied with hot air and damp air is removed from it in order to regenerate the drying device.

However, a conventional ventilator/dryer assembly as described above requires two blowers for operation, one dedicated to the forced circulation mechanism for drawing wet air from and blowing dried air back into the room and the other dedicated to feeding air to and discharging air out of the rotary drying device in order to regenerate it. With such a complicated air feeding system, the overall cost of the entire ventilator/dryer assembly would be relatively high.

Additionally, when air directly taken from the outside is used for regenerating the rotary drying device, such air is not controllable in terms of temperature and humidity if heated by means of a heater because it is subject to marked changes in temperature and humidity throughout the year. Also, if the outside is polluted to a significant extent, it can adversely affect the drying performance and the durability of the rotary drying device with time as the device is gradually coated with pollutants from the polluted air.

In view of these circumstances, it is therefore the object of the invention to provide a ventilator/dryer assembly comprising a rotary drying device that operates for drying wet air in a room with the device having a simple air feeding system and which can be efficiently regenerated for operation. With such a ventilator/dryer assembly, the size and the cost of the entire assembly is significantly reduced and the operation of drying air in the room is carried out in a simplified manner.

SUMMARY OF THE INVENTION

According to the invention, the above object is achieved by providing a ventilator/dryer assembly for drying wet air comprising a case main body having an air inlet port and an air outlet port. The inner space of said case main body is divided into a primary zone communicating at least with the air inlet port, a tertiary zone communicating with the air outlet port and a secondary zone disposed adjacent to the first and secondary zones. A blower is provided for drawing air from the room and forcibly circulating the air to the air outlet port sequentially by way of the primary zone, the secondary zone and the tertiary zone. The blower is preferably a centrifugal type air blower. A moisture-adsorbing/ drying means is exposed to the air passing through the secondary zone and flowing into the tertiary zone to adsorb moisture from the air and dry it. The moisture-adsorbing/ drying means comprises a cylindrical rotary type moisture adsorbing device. A heat recovering means causes part of the air flowing from the secondary zone into the tertiary zone to pass through the rotary type moisture adsorber device and recover heat therefrom. A regenerating means causes the air subjected to heat recovery by said heat recovering means to be reheated and returned to the rotary type moisture adsorbing device to pass therethrough again. The regenerating means comprises a regenerating chamber, an exhausting means for drawing the air regenerated by the regenerating means to the outside and a ventilating means for drawing the air flowing from the primary zone to the secondary zone by way of a moisture adsorbing/drying changeover means for drawing the air recovered and heated by the heat recovering means from an exhaust port arranged in the regenerating chamber to the tertiary zone and further to the outside by way of the air outlet port. An air feed port separates the primary zone and the secondary zone in the case main body and the air outlet port communicating with the tertiary zone are respectively provided with first and second anti-moisture shutters/designed to close the air feed port and the air outlet port whenever the ventilator/dryer assembly is out of operation.

The first anti-moisture shutter may be opened by the air pressure of the wet air drawn in from the room by the air blower, and the second anti-moisture shutter may be opened by the air pressure of the drying or heating air blown out from air outlet port.

BRIEF DESCRIPTION OF THE DRAWINGS

Other objects and advantage of the present invention will become more apparent in accordance with the following specification and annexed drawings in which:

FIG. 9 is a perspective view of the regenerating chamber fitted to the rotary type moisture adsorbing device of a ventilator/drier assembly;

FIG. 10 is a sectional side view of the regenerating chamber fitted to the rotary type moisture adsorbing device of a ventilator/drier assembly;

DETAILED DESCRIPTION OF THE PREFERRED EMBODIMENTS

Figure 1:
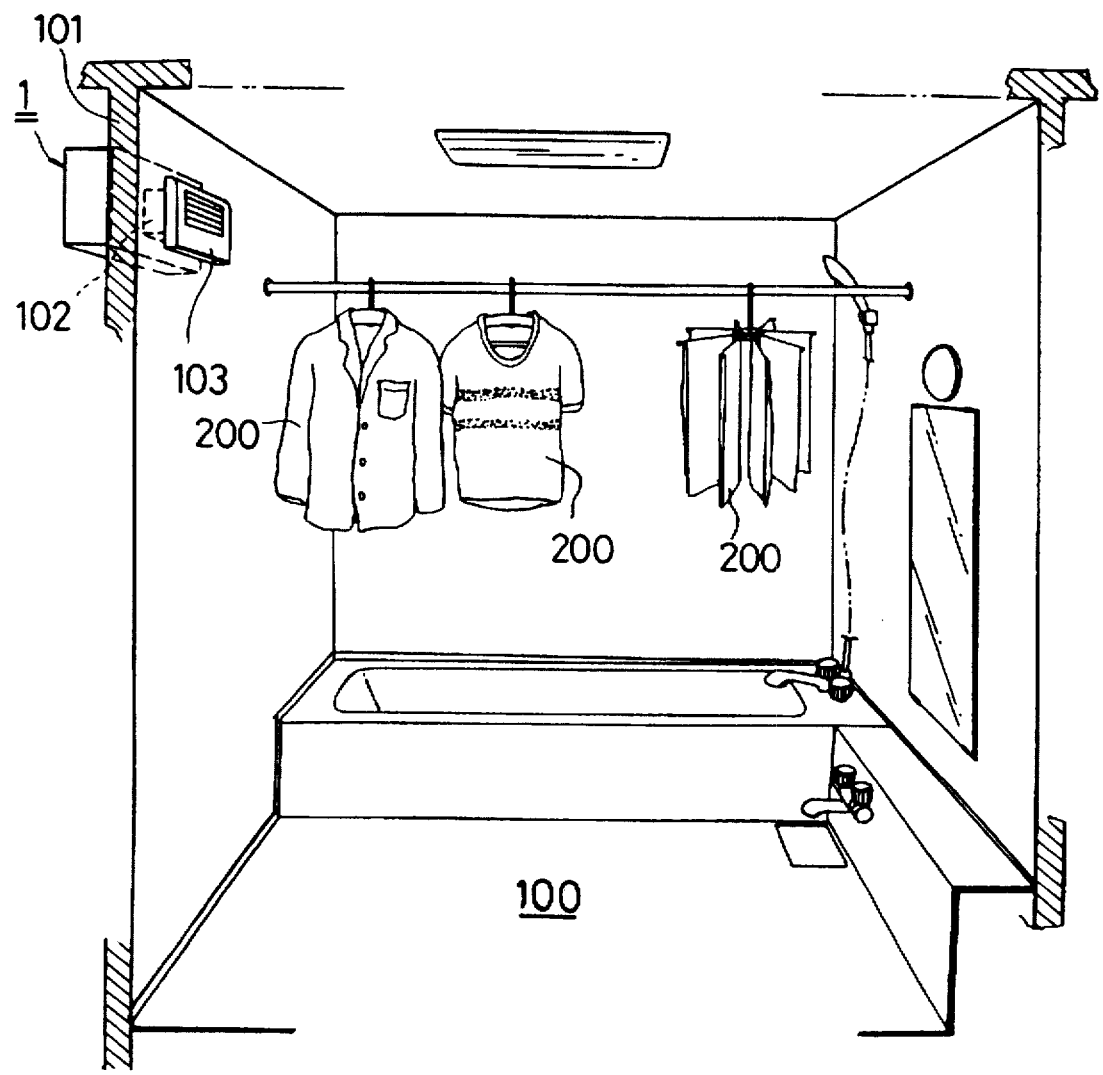
FIG. 1 is a schematic perspective view of a bathroom provided with a ventilator/drier assembly according to the invention.
Figure 2:
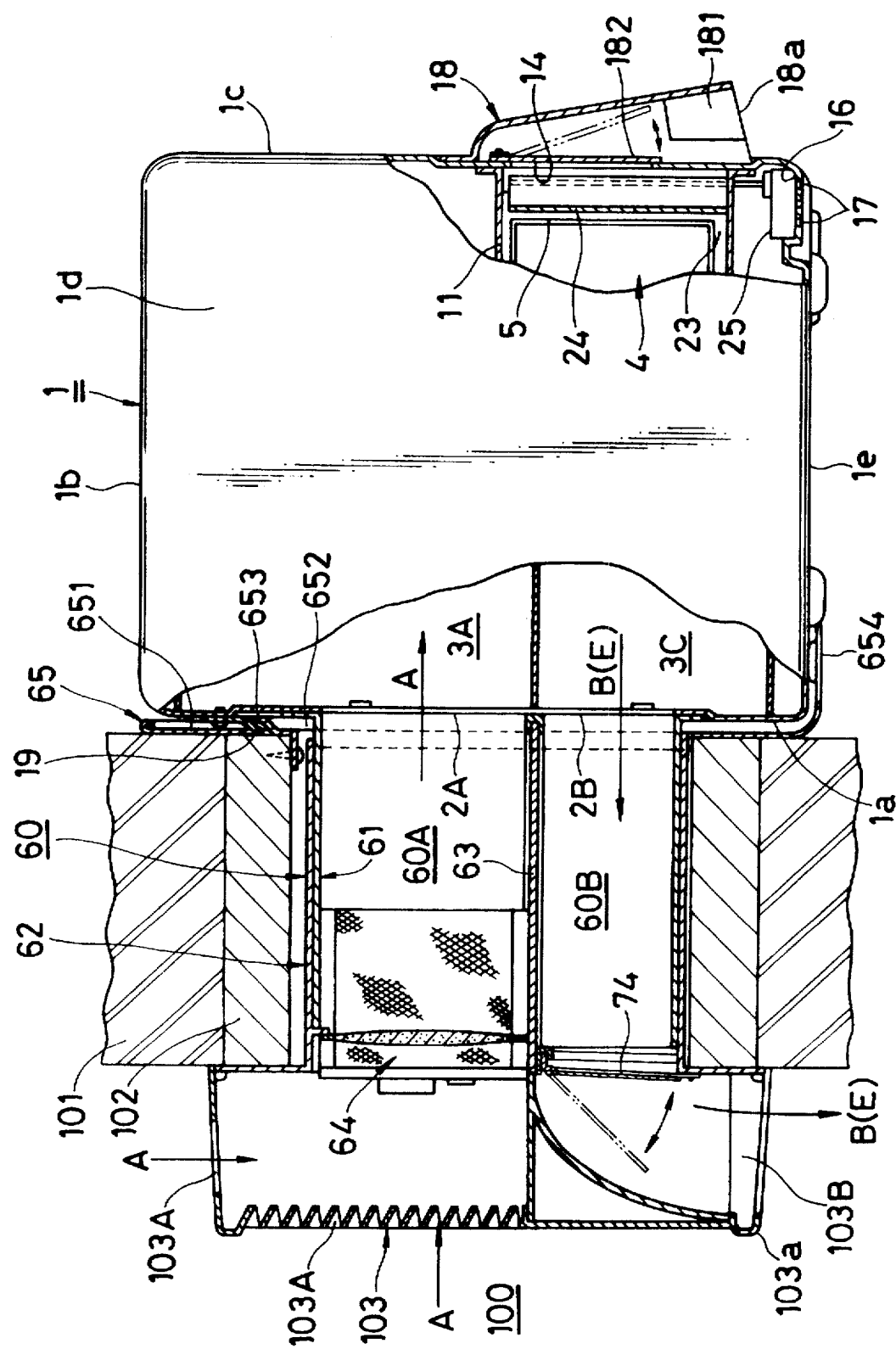
FIG. 2 is a schematic plan view of a ventilator/drier assembly according to the invention.

The present invention will be described by referring to the accompanying drawings that illustrate preferred embodiments of the invention. FIG. 1 is a schematic perspective view of a bathroom provided with a ventilator/drier assembly according to the invention. FIG. 2 is a schematic plan view of a ventilator/drier assembly according to the invention. Throughout the drawings, reference numeral 1 denotes a case main body of the ventilator/drier.

The case main body 1 can typically be fitted to a bathroom or a locker room in order to turn it into a moisture-adsorbing/drying room (a bathroom being shown in the drawings). More specifically, the case main body 1 is secured to the frame 102 of an existing ventilating fan of a bathroom 100 disposed on a side wall 101 of the bathroom by means of an adaptor, which is described below. The vent is provided on the inside with a removable decorative grille 103.

Figure 3:
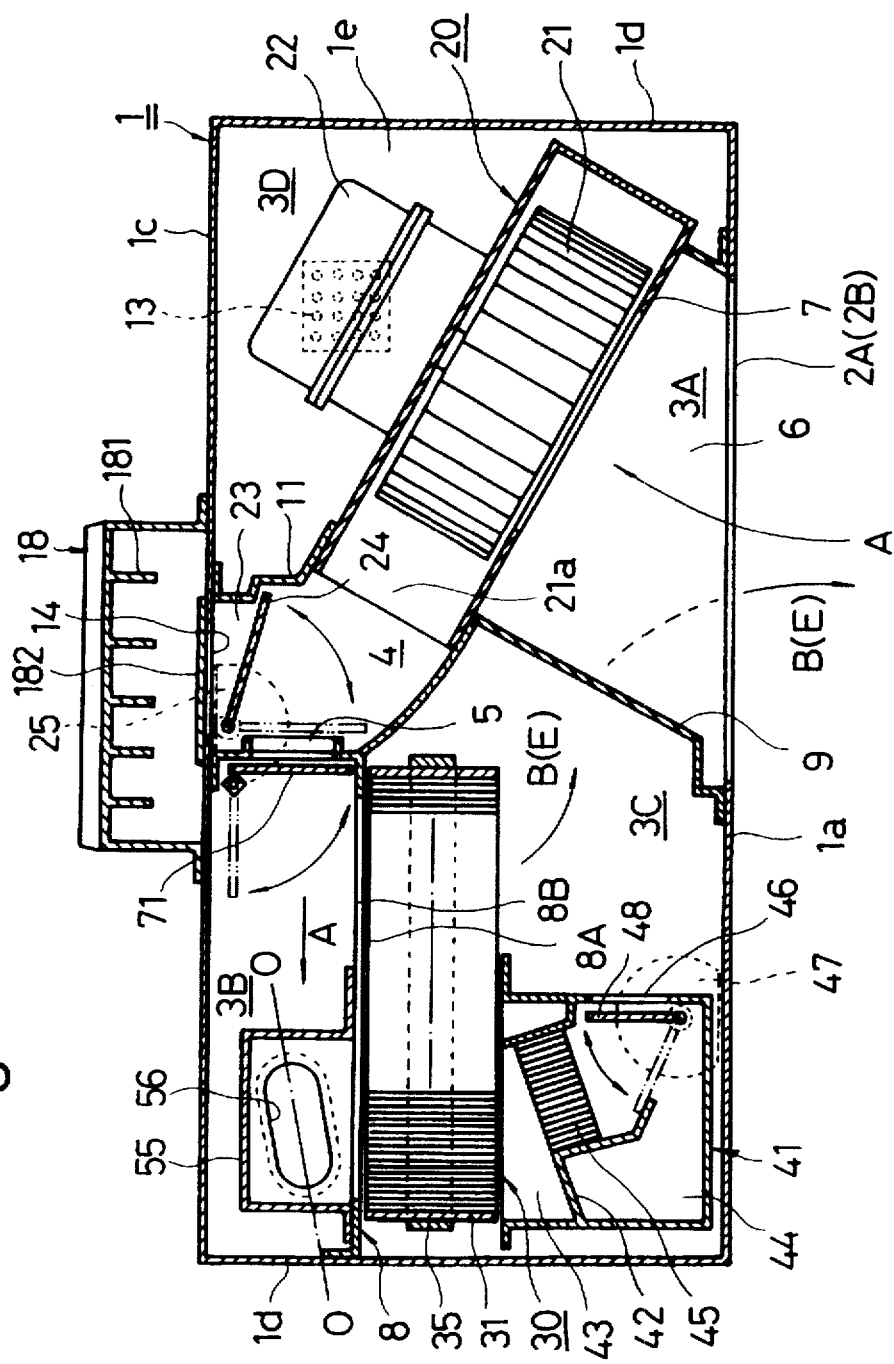
FIG. 3 is a schematic sectional side view of a ventilator/ drier assembly.
Figure 4:
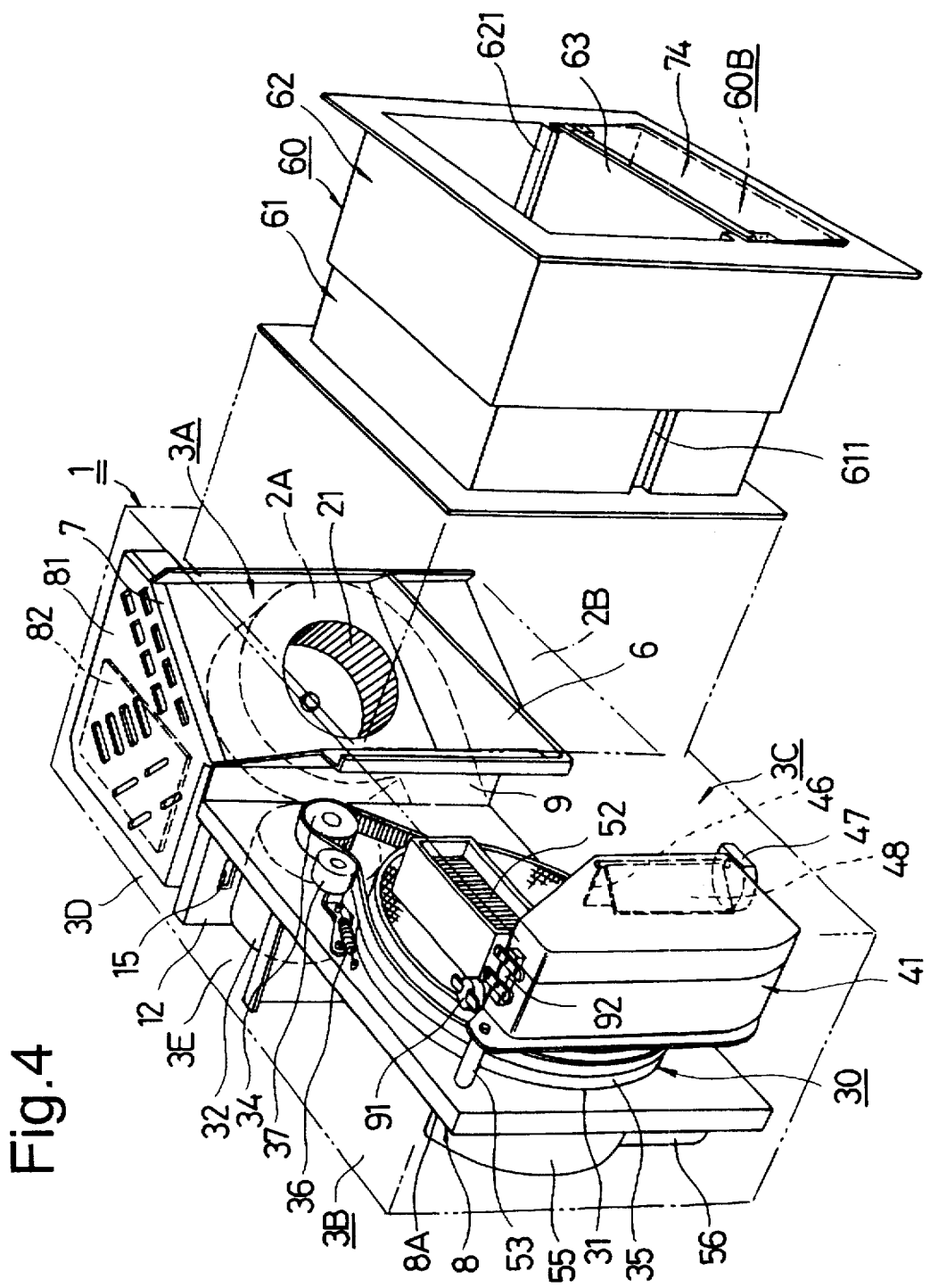
FIG. 4 is a schematic front perspective view of a ventilator/drier assembly.
Figure 5:
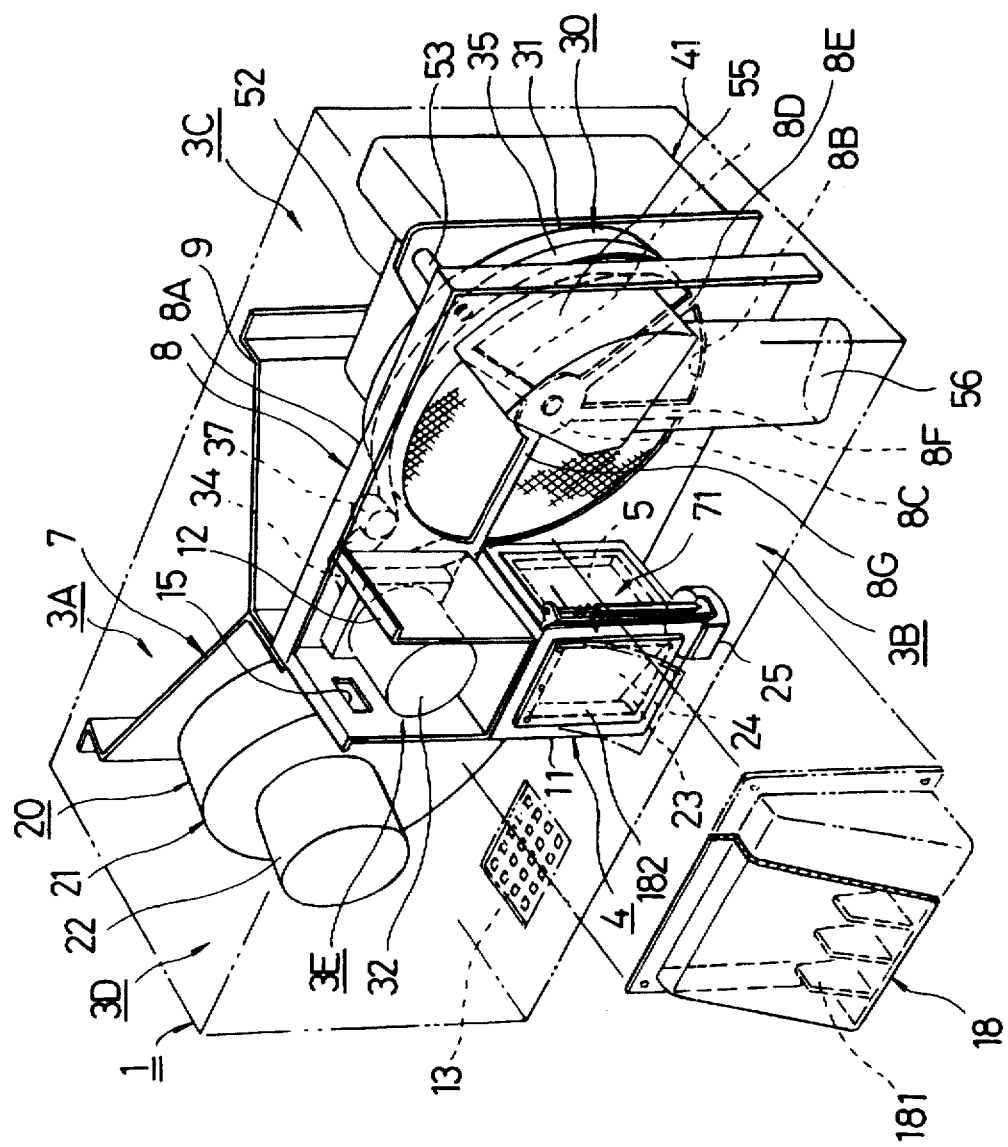
FIG. 5 is a schematic rear perspective view of a ventilator/ drier assembly.

As shown in FIGS. 3 through 5, the case main body 1 has a front panel 1a provided at about the center thereof with an air inlet port 2A and an air outlet port 2B arranged vertically side by side so that air can be drawn in and blown out through a single limited area on a single side of the case main body 1. A duct 60, which is described below, is fitted to the air inlet port 2A and the air outlet port 2B.

The inside of the case main body 1 is divided into a primary zone 3A communicating with said air inlet port 2A for drawing in wet air A of the bathroom by means of a forced circulation mechanism 20, which is described below.

A secondary zone 3B communicates with the primary zone 3A by way of an air feeding path 4 and an air feeding aperture 5 of the forced circulation mechanism 20. A tertiary zone 3C communicates with the secondary zone 3C by way of a moisture-adsorbing/drying mechanism 30 and also with said air outlet port 2B and a quaternary zone 3D where said forced circulation mechanism 20 is arranged. The zones are separated by means of first through fourth partition panels 6, 7, 8 and 9.

The primary zone 3A is defined by the first, second and fourth partition panels 6, 7 and 9 and the top wall 1b of the case main body 1. The secondary zone 3B is defined by a fifth partition panel 11, which also defines the air feeding path 4, and the third partition panel 8. A sixth partition panel 12 combined with the third partition panel 8 defines a fifth zone 3E for housing a drive motor 32 of the moisture-adsorbing/drying mechanism 30, which will be described hereinafter and the rear wall 1c and a lateral wall 1d of the case main body 1. The tertiary zone 3C is defined by the first, third and fourth partition panels 6, 8 and 9 and the front wall 1a, the lateral wall 1d and the bottom wall 1e of the case main body 1. The quaternary zone 4D is defined by the second, fifth and sixth partition panels 7, 11 and 12, the lateral wall 1d and the bottom wall 1e of the case main body 1. The second partition panel 7 is combined with the forced circulation mechanism 20 to form a removable unit.

The forced circulation mechanism 20 comprises a centrifugal blowing type air blower 21, which may be a Sirocco fan, provided with a drive motor 22 housed in the quaternary zone 3D. Blower 21 communicates with the ambient air by way of a first vent 13 arranged at the bottom wall 1e of the case main body 1. The air blower 21 is also provided with a nozzle 21a, to which the fifth partition panel 11 for defining said air feeding path 4 is fitted so that air A in the bathroom 100 may be circulated in sequence through the air inlet port 2A, the primary zone 3A, the secondary zone 3B, the tertiary zone 3C and the air outlet port 2B.

The rotary type moisture adsorbing device 31 of the moisture-adsorbing/drying mechanism 30 is to be in contact with air A drawn into the tertiary zone 3C from the secondary zone 3B by said air blower 21 to absorb the moisture contained in air A. The first vent 13 keeps the quaternary zone 3D in communication with the ambient air (external air) to provide an anti-moisture zone and operates as part of a first cooling mechanism for cooling the drive motor 22 of the air blower 21 located in the quaternary zone 3D.

The fifth partition panel 11 defining the air feeding path 4 is located under the sixth partition panel 12 defining the fifth zone 3E, where the drive motor 32 of the moisture-adsorbing/drying mechanism 30 is located. The air feeding path 4 is provided at its rear with an opening 23, which is arranged opposing a vent 14 at the back side 1c of the case main body 1.

Reference numeral denotes a ventilation/drying changeover damper. The ventilation/drying changeover damper 24 is typically driven to operate by a step motor 25 so that it blocks the opening 23 at the rear of the air feeding path 4 in the moisture-adsorbing/drying mode of operation. In the ventilation mode of operation, damper 23 blocks the air feeding aperture 5 so that wet air A drawn in by the air blower 21 of the forced circulation mechanism 20 from the bath room 100 through the air inlet port 2A, the primary zone 3A and the secondary zone 3B is directly blown out of the vent 14 by way of said opening 23.

The rotary type moisture adsorbing device 31 of the moisture-adsorbing/drying mechanism 30 preferably is removably fitted to the third partition panel 8 as a cylindrical unit having a ceramic honeycomb laminate structure that contains polymerized microporous silicate gel of a plurality of metals such as cobalt, iron and manganese. The micropores are regulated to adapt to water molecules and deposits by a large number of hydroxyl radicals to enhance the hydrophilic action of the silicate gel so that it may have an excellent moisture adsorbing and releasing property. The cylindrical unit typically has a diameter of 20 cm and is rotated at a rate of ½ rotation per minute.

Figure 6:
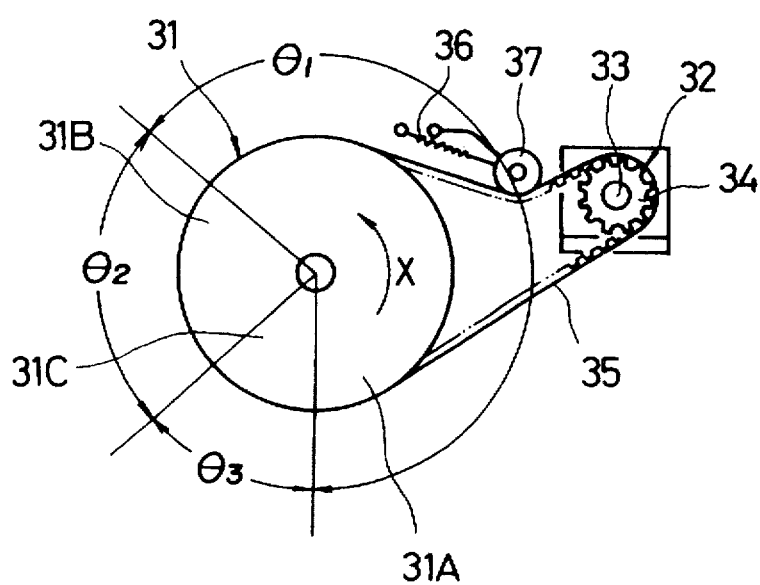
FIG. 6 is a schematic view of a rotary type moisture adsorbing device to be used in a ventilator/drier assembly.

As shown in FIG. 6, the rotary type moisture adsorbing device 31 has a moisture removing position 31A, a regenerating position 31B and a heat recovering position 31C arranged sequentially in the sense of rotation shown by arrow X. The surface areas of the rotary type moisture adsorbing device 31 are allocated respectively to the moisture removing position 31A, the regenerating position 31B and the heat recovering position 31C, these positions being defined in terms of central angles θ1, θ2 and θ3, these angles (θ1>=θ2>=θ3) typically having a ratio of 5:2:1. The rate of air flow in the moisture removing position 31A to the corresponding rate in the regenerating position 31B may be 200($m^3$/h):20($m^3$/h). The rotary type moisture adsorbing device 31 is driven a motor 32 having a rotary shaft 33 and a reduction gear 34, which is linked with the device 31 by way of a driving belt 35 equipped with a tension roller 37 urged to press and tension the driving belt 35 by a spring 36.

A first chamber (regenerating chamber) 41 is arranged at a side of the tertiary zone 3C at a position corresponding to the regenerating position 31B and the heat recovering position 31C of the rotary type moisture adsorbing device 31. As shown in FIG. 3, the first chamber 41 contains therein a partition wall 42 for separating therein an air lead-in path 43 for a branched flow of dry air coming from the heat recovering position 31C of the rotary type moisture adsorbing device 31 and an air lead-out path 44 for turning the flow of dry air back to the regenerating position 31 B of the rotary type moisture adsorbing device 31.

The lead-in path 43 if provided with an electric heater 45, which is a sheathed heater (PTC heater), for heating the branched flow of dry air coming from the heat recovering position 31C of the rotary type moisture adsorbing device 31. The electric heater 45 has a rectangular air heating surface disposed obliquely relative to the heat recovering position 31C of the rotary type moisture adsorbing device 31. A drying/heating changeover damper 48 of a drying/heating changeover means, which will be described hereinafter, is swingably contained in a space of the air lead-in path 43 located downstream relative to the electric heater 45.

The drying/heating changeover means comprises an exhaust port 46 communicating with a lateral wall of the first chamber 41 arranged on the side of the tertiary zone 3C and the drying/heating changeover damper 48 is driven to close or open the exhaust port 46 by a step motor 47. When the exhaust port 46 of the first chamber 41 is opened by the drying/heating changeover damper 48, regenerating air C heated by the electric heater 45 is discharged into the tertiary zone 3C and then into the room 100 by way of the air outlet port 2B to heat the inside of the room. For the drying mode of operation, the exhaust port 46 is closed.

Figure 7:
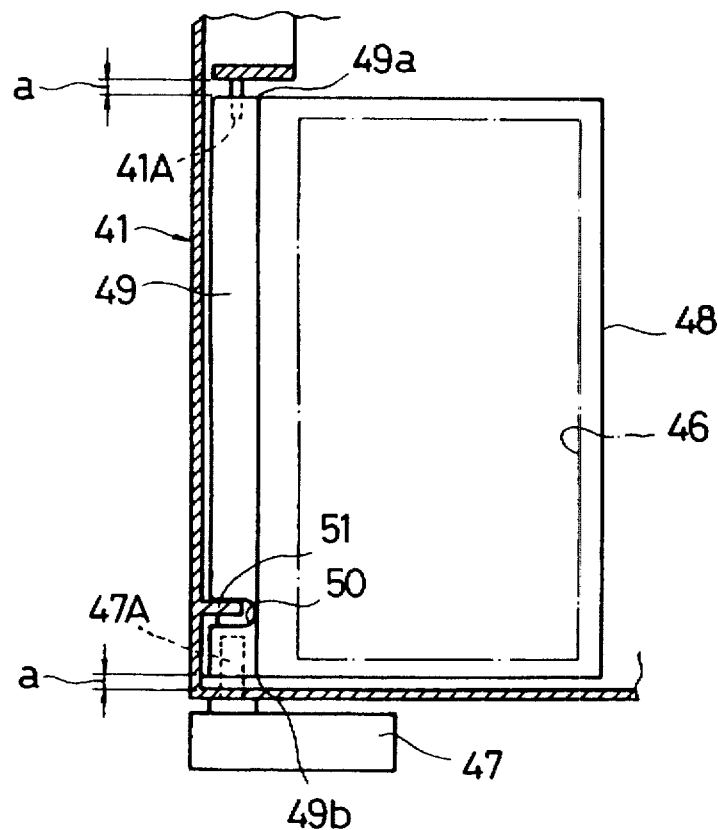
FIG. 7 is a schematic lateral view of a damper arranged in the regenerating chamber of a ventilator/drier assembly.
Figure 8:
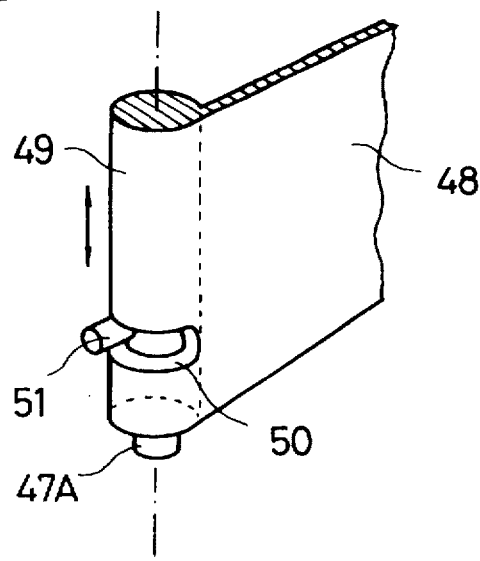
FIG. 8 is an enlarged schematic perspective view of a principal portion of a damper arranged in the regenerating chamber of a ventilator/drier assembly.

As shown in FIGS. 7 and 8, the drying/heating changeover damper 48 has a rotary shaft 49, which is supported at the top 49a by a Pin 41A projecting into the chamber housing, and at the bottom 49b by the drive shaft 47A of a step motor 47 that drives the changeover damper 48 to rotate. The rotary shaft 49 is provided with a horizontal engagement slit 50 for engagedly receiving a dowel 51 projecting from the inner wall surface of the chamber housing.

The dowel 51 is arranged to prevent the bottom 49b of the rotary shaft 49 from falling and touching the inner bottom surface of the chamber housing as it is lowered by the weight of the drying/heating changeover damper 48 and to prevent the top 49a and the bottom 49b of the rotary shaft 49 from touching the corresponding wall surfaces of the chamber housing as it is expanded by heat. With this arrangement, the load of the step motor 47 is reduced and a minimum clearance "a" can be obtained for the top 49a and the bottom 49b of the rotary shaft 49.

Reference numeral 52 in the drawings denotes an electric heater (PTC heater) integrally supported by the chamber 41 and typically having a capacity of 600 W. It has a rectangular, wide heating surface horizontally disposed opposing an upper portion of the moisture removing position 31A of the rotary type moisture adsorbing device 31 facing the tertiary zone 3C of the case main body 1. When heater 52 is operated, it heats dry air B treated for removing moisture and heated dry air E is forced out through said air outlet port 2A to heat the inside of the room 100. The electric heater 52 is located vis-a-vis an upper portion of the moisture removing position 31A of the rotary type moisture adsorbing device 31 so that air flows relatively slowly there so that dry air B treated for removing moisture can be heated efficiently in that portion.

The rotary type moisture adsorbing device 31 is rotatably supported by a sealing panel member 8A that serves as the third partition panel 8 separating the secondary zone 3B and the tertiary zone 3C of the case main body 1. The sealing panel member 8A is provided with a vent 8B having a diameter smaller than that of the rotary type moisture adsorbing device 31 (e.g., 20 cm). Vent 8B has at the center thereof a bearing section 8C for bearing the rotary type moisture adsorbing device 31. The bearing section 8C is supported by radial bars 8D, 8E and 8F extending between the bearing section 8C and the outer peripheral edge of the vent 8B to define areas respectively corresponding to the moisture removing position 31A, the regenerating position 31B and the heat recovering position 31C of the rotary type moisture adsorbing device 31. There is also provided a radial reinforcing bar 8G extending between the bearing section 8C and the outer peripheral edge of the vent 8B that divides the area corresponding to the moisture removing position 31A into two parts.

Figures 9, 10:
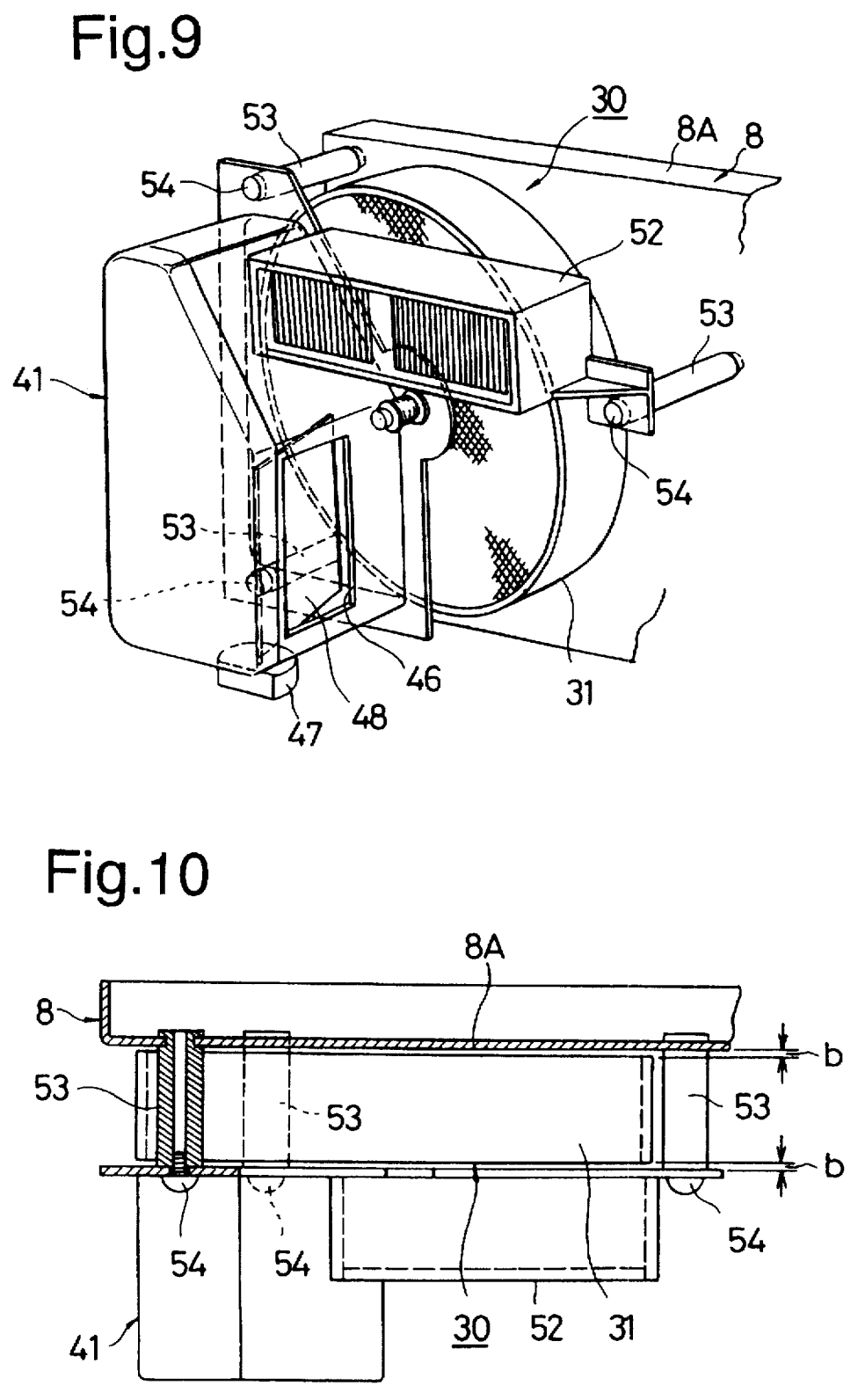

The reinforcing bar 8G protects the sealing panel member 8A and prevents it from becoming deformed by the thermal stress caused therein when the rotary type moisture adsorbing device 31 is heated to high temperature. As shown in FIGS. 9 and 10, three shaft members 53 serve as spacer members extending between the regenerating chamber 41 and the sealing panel member 8A and extend around the rotary type moisture adsorbing device 31 at positions equi-angularly separated from each other by an angle of 120°. Each of the spacer members 53 is fixed at one end thereof on the sealing panel member 8A and secured at the opposite end by a threaded section 54 so that the rotary type moisture adsorbing device 31 is separated from the sealing panel member 8A and the regenerating chamber 41 by a clearance "b" of about 0.5 mm. With this arrangement, any increase in the torque due to the contact of the rotary type moisture adsorbing device 31 and the regenerating chamber 41 or the sealing panel member 8A that can occur due to uneven rotation of the device 31 and any resultant wear of the contacting surface are effectively avoided.

A second chamber 31 (exhaust chamber) 55 is arranged opposing the lead-out path 44 of the first chamber 41 on the side of the secondary zone 3B of the rotary type moisture adsorbing device 31 at a location corresponding to the device regenerating position 31B. An exhaust pipe 56 is connected to the bottom of the second chamber 55 and exposed to the outside environment through the bottom of the case main body 1. The exhaust pipe 56 has an elliptic cross-section, as shown in FIG. 3, such that the long axis O—O of the ellipse is not horizontal and open relative to the direction of the flow of air A coming from the primary zone 3A and is fed into the secondary zone 3B by way of the air feeding path 4. This makes it easy for air to be taken into the heat recovering position 31C of the rotary type moisture adsorbing device 31 located at a lower area of the back side of the second chamber 55.

Figure 11:
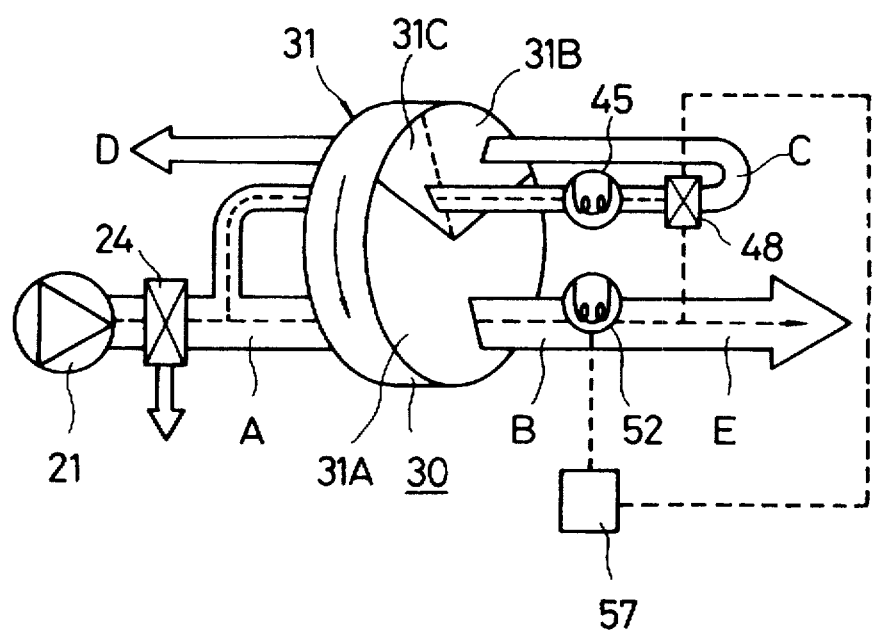
FIG. 11 is a schematic view illustrating how a ventilator/drier assembly according to the invention operates for ventilating and moisture-adsorbing/drying the wet air in the room provided with the assembly and how the rotary type moisture adsorbing device of the ventilator/drier assembly operates for regenerating and heating the drawn air.

More specifically, as shown in FIG. 11, part of wet air A fed into the secondary zone 3B from the primary zone by blower 21 is made to flow through the heat recovering position 31C of the rotary type moisture adsorbing device 31 so that the moisture contained therein may be adsorbed there and further through the air lead-in path 44 of the first chamber 41 so that heated regenerating air C may be returned to the regenerating position in a direction opposite to the direction along which wet air A flows and pass through the regenerating position 31B of the rotary type moisture adsorbing device 31 in order to regenerate the rotary type moisture adsorbing device 31.

Air D produced after a regenerating operation is then driven out from the bottom of the case main body 1 through the exhaust pipe 56 connected to the second chamber 55. On the other hand, air B produced from the moisture removing position 31A after a moisture removing and drying operation is returned into the room 100 by way of the tertiary zone 3C and the air outlet port 2B to remove moisture and dry the inside of the room 100.

It should be noted that the heat recovering position 31C of said rotary type moisture adsorbing device 31 operates to cause wet air A fed into the secondary zone 3B to pass through the rotary type moisture adsorbing device 31 that is heated because of the operation of the regenerating position 31B in order to cool the device 31. The electric heater 45 for heating regenerating air C at the heat recovering position 31C typically has a capacity of 600 W so that dry air B blown into the room 100 through the air outlet port 2B is heated to temperature higher than the room temperature.

On the other hand, when the ventilator/drier assembly is operated simply for ventilating the inside of the room 100, the ventilation/drying changeover damper 24 is opened to clear the opening 23 of the air feeding path 4. At the same time, the air feeding aperture 5 leading to the secondary zone 2B is closed so that wet air A drawn from the room 100 by the blower 21 of the forced circulation mechanism 20 through the air inlet port and the air feeding path 4 is directly driven out to the outside via the vent 14.

In the heating mode of operation of the ventilator/drier assembly for heating the room 100, the electric heater 52 arranged in the first chamber 41 is turned on and the drying/heating changeover damper 48 is opened to clear the exhaust port 46 so that heating air E heated by the electric heaters 45 and 54 is driven out into the room 100 through the air outlet port 2A.

The operation of the electric heater 52 and that of the ventilation/drying changeover damper 24 are controlled by means of a temperature sensor 57 arranged outside the exhaust pipe 56 exposed to the outside in such a way that the heater and the damper are energized for heating the room when the temperature of the ambient air falls below a first temperature, for example, 15° C. or the room temperature falls below a second temperature, for example, 17° C., and they are switched to the drying mode of operation when the room temperature rises to a predetermined temperature (for example +2° C.).

The rotary shaft of the blower 21 and that of the rotary type moisture adsorbing device 31 of the moisture-adsorbing/drying mechanism 30 are arranged in parallel with each other in the same plane which is perpendicular to the front panel of the case main body 1 facing the inside of the room 100. The air drawing plane of the blower 21 is disposed obliquely relative to the air drawing plane of the air inlet port 2A to reduce the width and the length of the case main body 1 as viewed from the front panel facing the inside of the room 100.

Reference numeral 15 denotes a second vent arranged on the sixth partition panel 12 defining the fifth zone 3E that places the quaternary zone 3D and the fifth zone 3E in communication with each other so that the ambient air coming into the anti-moisture region of the quaternary zone 3D through the first vent 13 is drawn into the fifth zone 3E to cool the drive motor 32 of the rotary type moisture adsorbing device 31 housed in the fifth zone 3E. In other words, the second vent 15 operates as part of a second cooling mechanism for cooling the drive motor 32.

Reference numeral 16 denotes a motor housing section arranged on the bottom 1e of the case main body 1. The motor housing section 16 contains the step motor 25 secured to a predetermined position for controlling the operation of the ventilation/drying changeover damper 24 and it is provided on the bottom with a third vent 17 communicating with the ambient air surrounding the room. Thus, the third vent 17 operates as part of a third cooling mechanism for cooling the step motor 25 housed in the motor housing section 16, which is an anti-moisture region. Likewise, the step motor 47 for controlling the operation of the drying/heating changeover damper 48 in the regenerating chamber 41 is disposed in an anti-moisture region and cooled by a similar cooling mechanism (see FIG. 4).

Reference numeral 18 (see FIG. 2) denotes a protection cover provided for protecting the vent 14 disposed on the rear side 1c of the case main body 1 against adverse effects of the outside. The protection cover 18 is open at the bottom 18a thereof and is broadened toward the bottom. It is designed to drive out wet air A of the room through the vent 14 in the ventilation mode of operation and is provided with a plurality of ribs 181 which prevents small objects such as insects from entering the case main body 1 through the vent 14 when the ventilator/drier assembly is out of operation or in the drying/heating mode of operation. The ventilation/drying changeover damper 24 also operates as such a preventive measure when it closes the opening 23.

The vent 14 may be provided with a shutter 182 of a thin rubber panel arranged on the outside of the case main body 1 and secured to the case main body 1 at the upper edge thereof by means of an appropriate securing means to ensure a tightly closed condition of the vent 14 when the ventilator/drier assembly is out of operation. With such an arrangement, the shutter 182 is opened toward the outside under air pressure when the ventilator/drier assembly is operated for ventilation so that small objects such as ants, mosquitoes other insects may not enter the case main body 1 from the outside.

On the other hand, the air inlet port 2A and the air outlet port 2B, vertically arranged at the front panel 1a of the case main body 1, are provided with a duct 60 surrounding them. The duct 60 comprises a first duct member 61, a second duct member 62 which is telescopically slidable on the first duct 61, a horizontal partition panel 63 for defining vertically arranged air inlet path 60A and air outlet path 60B in correspondence to the respective air inlet port 2A and the air outlet port 2B of the case main body 1, and a removable air filter 64 removably arranged in the air inlet path 60A in the upper half of the first duct 61 and the second duct 62 to correspond to the air inlet port 2A of the case main body 1. These components of the duct 60 can be disassembled. The decoration grille 103 is removably fitted to the front end of the second duct 62 to cover the entire opening thereof.

Figure 12:
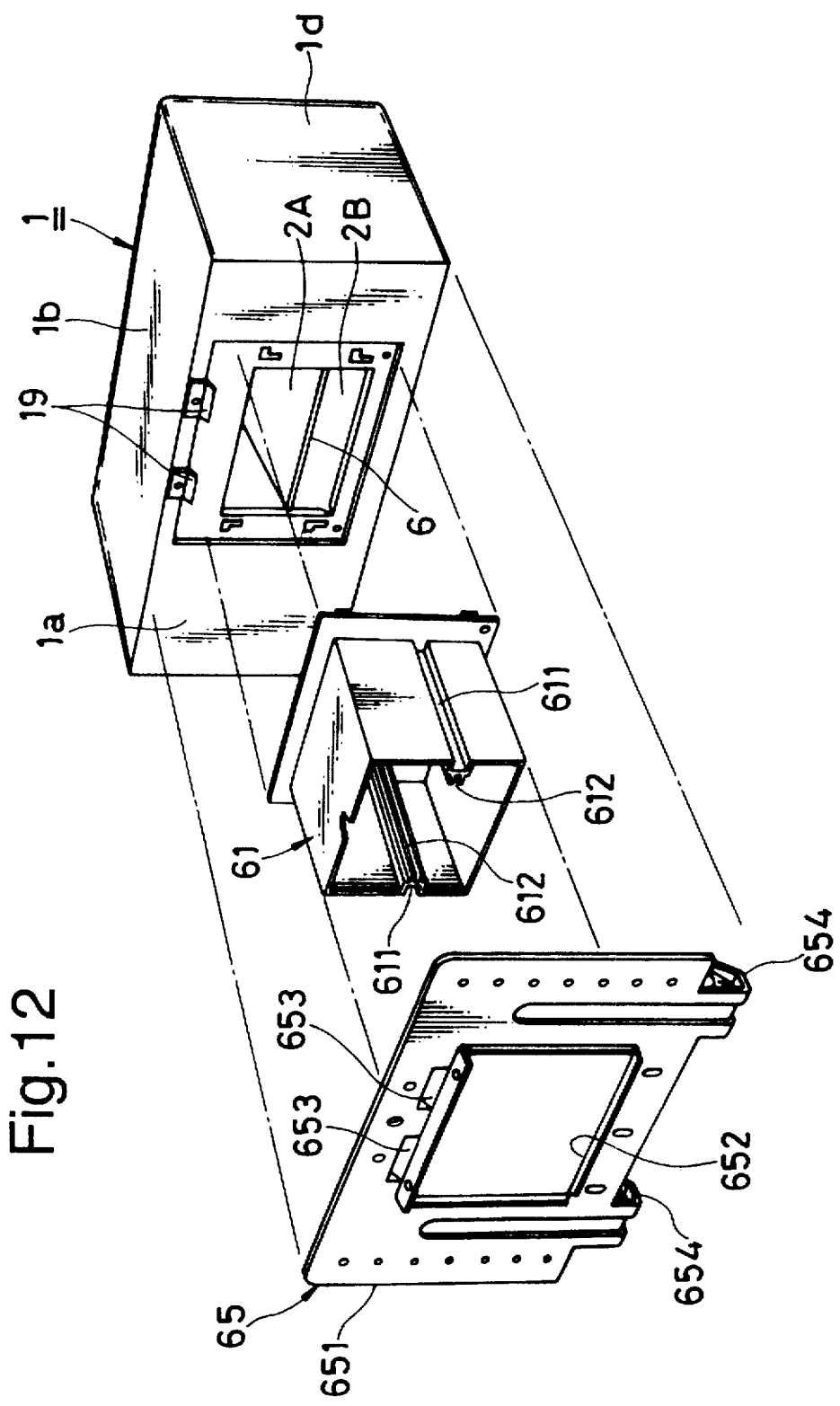
FIG. 12 is a schematic exploded perspective view of the case main body and a first duct of a ventilator/drier assembly according to the invention, illustrating how they are fitted to the frame of a ventilating fan from the outside of the room provided with the assembly.
Figure 13:
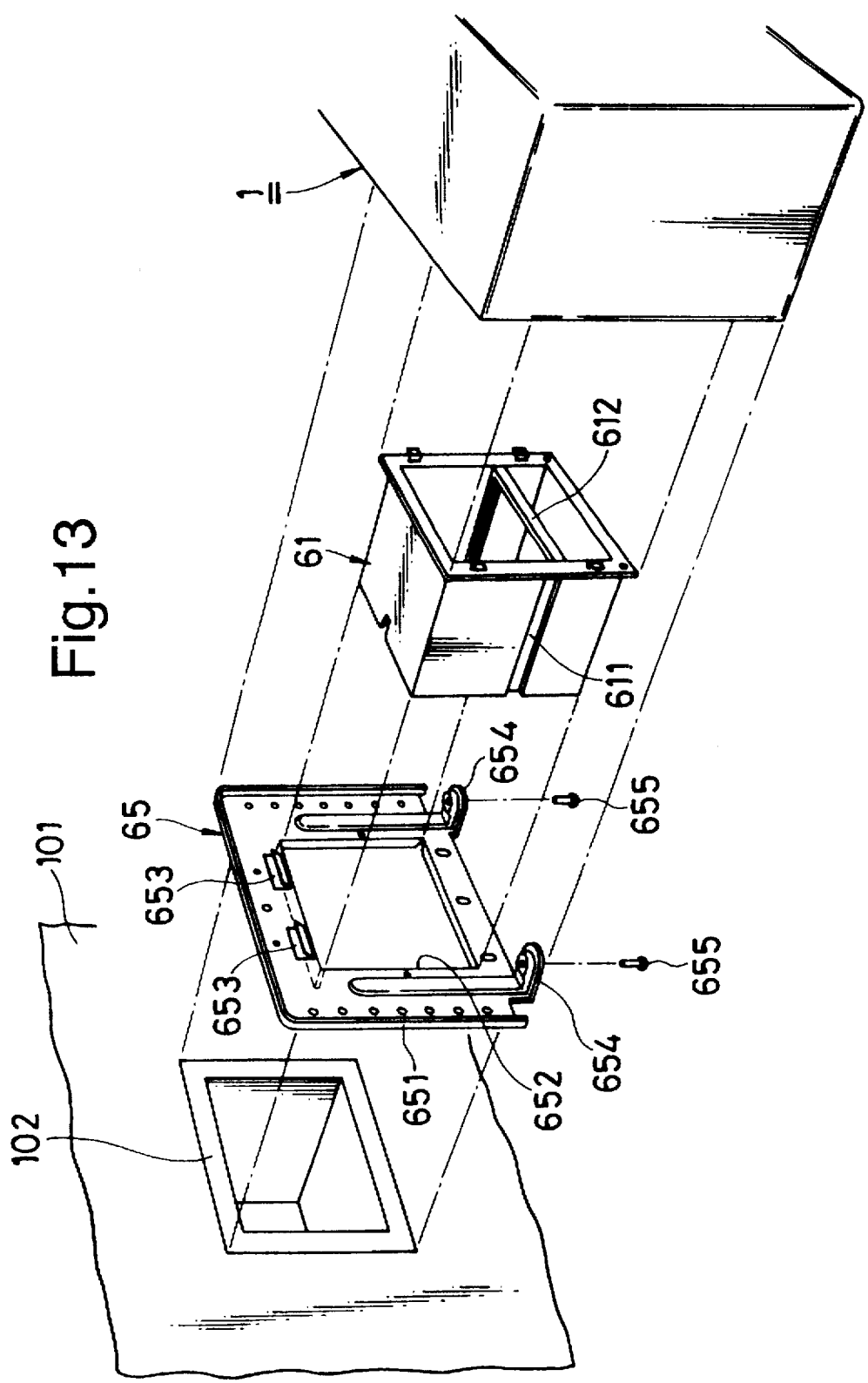
FIG. 13 is a schematic exploded perspective view of the case main body and a first duct of a ventilator/drier assembly according to the invention, illustrating how they are fitted to the frame of a ventilating fan from the outside.

As seen from FIGS. 12 and 13, the first duct 61 is provided on the outer lateral surfaces thereof with a pair of horizontal grooves 611, 611 and on the inner lateral surfaces with a pair of inwardly projecting first grooved engaging ridges 612, 612 for engagedly supporting the horizontal partition 63 at positions corresponding to the respective grooves 611, 611. Note that the first engaging ridges 612, 612 are bridged by a bar for supporting the rear edge of the partition panel 63.

Figure 14:
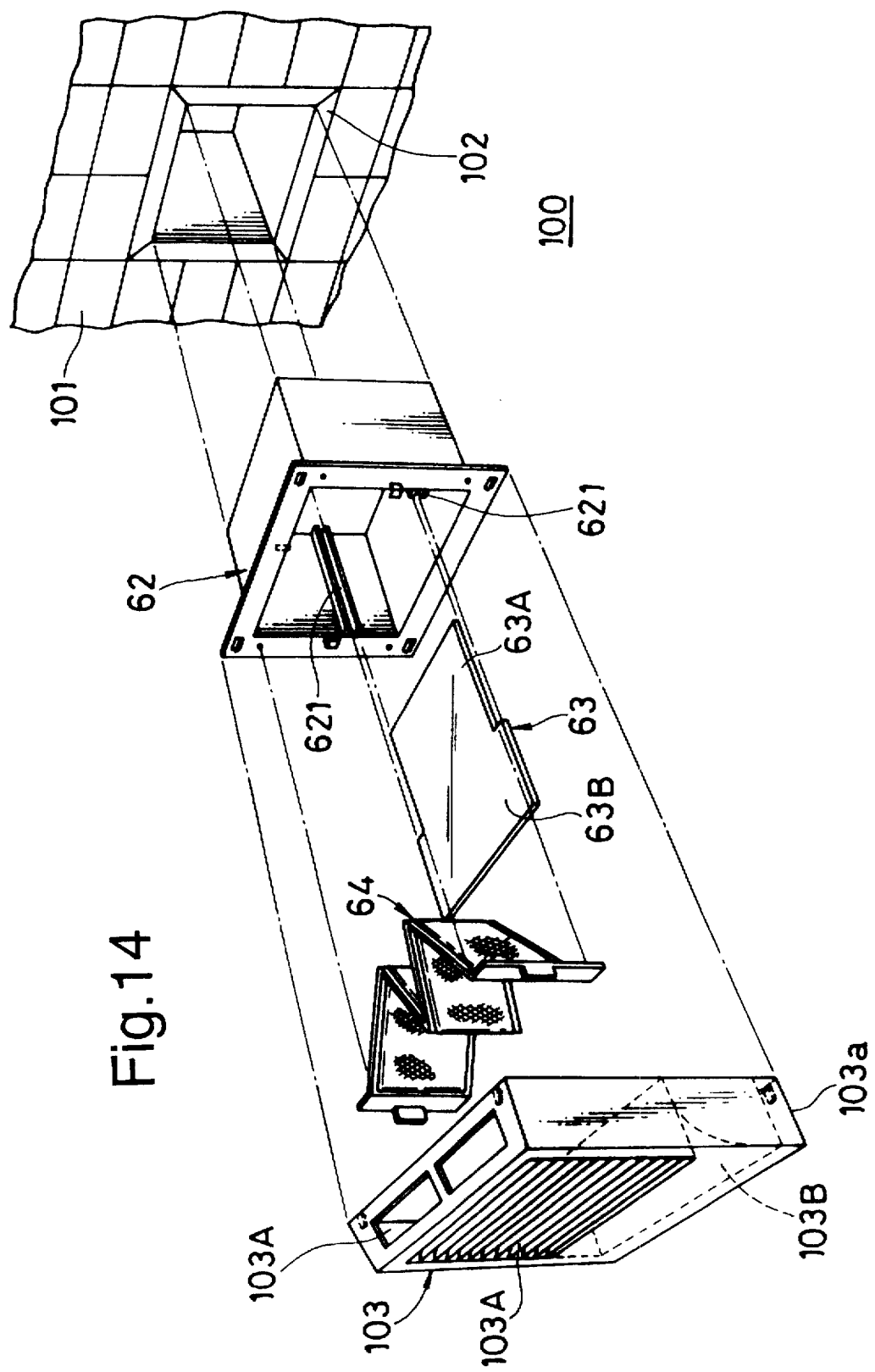
FIG. 14 is a schematic exploded perspective view of the case main body and a first duct of a ventilator/drier assembly according to the invention, illustrating how a second duct, an air filter and a decoration grille are fitted thereto.
Figure 15:
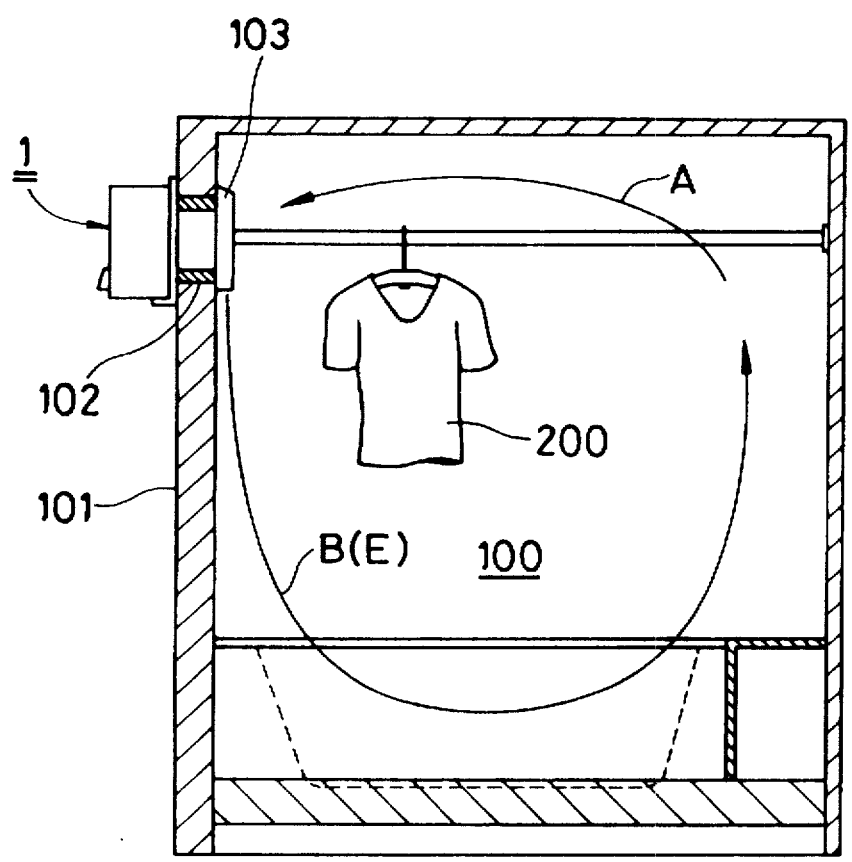
FIG. 15 is a schematic sectional view of a room provided with a ventilator/drier assembly according to the invention, illustrating how the air from which moisture is adsorbed is discharged into the room.

As seen from FIG. 14, the second duct 62 is also provided on the inner lateral surfaces thereof with a pair of second horizontal grooved engaging ridges 621, 621 for engaging with the respective grooves 611, 611 arranged on the outer lateral surfaces of the first duct 61. Said second grooved engaging ridges 621, 621 are disposed in correspondence to the respective first grooved engaging ridges 612, 612 of the first duct 61 for engagedly supporting the partition panel 63.

The horizontal partition panel 63 engaged with the first and second grooved engaging ridges 612, 612, 621, 621 of the first and second ducts 61, 62 has a narrow section and a wide section determined respectively according to the internal width of the first duct 61 and that of the second duct 62. The length of the partition panel 63 is made longer than that of the frame 102 of the ventilating fan, while the length of the rear narrow section 63A of the partition panel 63 that corresponds to the first duct 61 is made equal to that of the first duct 61. The wide section 63B of the partition panel 63 that corresponds to the second duct 62 may be cut lengthwise depending on the length of the frame 102 of the ventilating fan.

There is a filter 64 that is typically a long piece of unwoven fabric provided along the periphery thereof with a plastic frame having a plurality of hinge sections along the top and bottom thereof that are arranged symmetrically so that the filter appears zigzag.

The decoration grille 103 is divided into upper and lower sections by a partition member and provided on an upper portion of the front and on the top with air inlet apertures 103A communicating with the air inlet path 60A located in an upper portion of the second duct 62 which is separated by the partition panel 63. The grille is provided on the bottom 103a thereof with an air blow out aperture 103B communicating with the air outlet path 60B so that dry air B or heating air E blown out from the air outlet port 2B of the case main body 1 is discharged vertically downward along the side wall 101 of the room 100 on which the ventilator/drier assembly is installed.

For installing a ventilator/drier assembly according to the invention to a wall 101 of a room 100, the frame 102 of a ventilating fan typically having a height and a length dimensioned to be 150 mm and 200 mm respectively is used. First, a fitting unit 65 is rigidly secured to the outside of the frame 102 of the ventilating fan.

The fitting unit 65 comprises a support base panel 651 having a central opening 652 for snugly receiving the first duct 61 fitted to the case main body 1 and a pair of engaging apertures 653, 653 for engagedly and respectively receiving a pair of hook members 19, 19 of the case main body 1 arranged horizontally along the upper edge of the air inlet port 2A and the air outlet port 2B of the case main body 1 and a pair of seat members 654, 654 arranged horizontally and projecting forward from the lower end of the support base panel 651.

After rigidly securing the fitting unit 65 to the frame 102 of the ventilating fan, the first duct 61 is fitted to the air inlet port 2A and the air inlet port 2A of the case main body 1 and then introduced into the central opening 652 of the fitting unit 60 that is rigidly secured to the frame 102 of the ventilating fan from the outside so that the first duct 61 is received by the frame 102. At the same time, the hook members 19, 19 of the case main body 1 are brought into engagement with the respective engaging apertures 653, 653 of the fitting unit 65 so that the case main body 1 is held on the seat members 654, 654. Then, the case main body 1 is rigidly secured to the seat members 654, 654 by means of respective screws 655, 655.

After securing the case main body 1 to the frame 102 of the ventilating fan disposed at the side of the room 100, the second duct 62 is introduced into the frame 102 of the ventilating fan from the inside of the room 100 and then made to telescopically receive the first duct 61 by bringing the second grooved engaging ridges 621, 621 on the inside of the second duct 62 into slidable engagement with the respective grooves 611, 611 on the outside of the first duct 61. The position of the second duct 62 can be adjusted by slidingly moving it relative to the first duct 61 according to the length of the frame 102 of the ventilating fan (or the thickness of the wall of the room) before it is rigidly secured to the frame 102 by means of screws from the inside of the room.

Then, the partition panel 63 is inserted into the engaging grooves 612, 612, 621, 621 of the first and second ducts 61 and 62 that are now secured to the frame 102 of the ventilating fan in order to divide the first and second ducts 61 and 62 into upper and lower sections and define an air inlet path 60A and an air outlet path 60B.

Under this condition, since the partition panel 62 has a narrow section and a wide section to correspond to the first and second ducts 61, 62, and its overall length is made longer than the length of the frame 102 of the ventilating fan, the front end of the wide section 63B of the partition panel 62 may be projecting from the corresponding end of the opening of the duct 62 when the partition panel 62 is fully inserted into the engaging grooves 612, 612, 621, 621 from the inside of the room. If such is the case, the projecting excessive portion of the wide section 63B of the partition panel 62 has to be cut to make the partition panel 62 correspond to the length of the frame 102.

Since the inside of the first and second ducts 61, 62 is divided by the partition panel 63 into an upper air inlet path 60A and a lower air outlet path 60B, the air filter 64 is fitted to the air inlet path 60A on the upper half of the first and second ducts 61, 62 and then the decoration grille 103 is removably fitted in position to cover the entire opening of the second duct 62.

Once the ventilator/drier assembly is installed in position and operated, wet air A is taken into the case main body 1 from the inside of the room 100 by way of the air inlet apertures 103A of the decoration grille 103, the air inlet path 60A of the duct 60 and the air inlet port 2A, and the moisture contained therein is adsorbed so that the air is dried by the moisture-adsorbing/drying mechanism 30 and dried or heated air B (E) is then discharged straight downward along the lateral wall 101 of the room 100 from the air blow out aperture 103B by way of the air outlet port 2B of the case main body 1 and the air outlet path 60B of the duct 60. The air discharged downward along the lateral wall 110 of the room 100 then moves on the floor and then rises along the other walls of the room until it gets to the ceiling and falls downward to establish a circulation route. Wet air A in the room is constantly drawn into the case main body 1 from the inside of the room 100 by way of the air inlet apertures 103A of the decoration grille 103, the air inlet path 60A of the duct 60 and the air inlet port 2A to maintain the circulation route so that the air in the room 100 is effectively and efficiently dried and heated. Additionally, since dried or heated air B (E) does not directly hit any hanging object 200 to be dried, such as a washed wear, it does not give rise to any shortage problem in the room with the object to be dried unlike any comparable know assemblies of the type under consideration.

Figure 16:
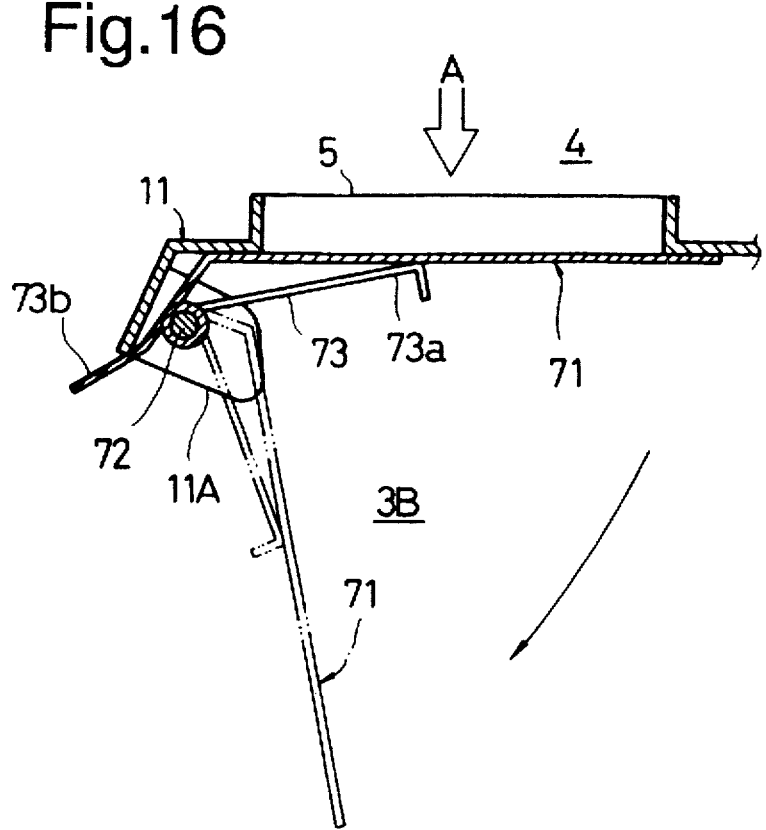
FIG. 16 is a schematic sectional side view of the anti-moisture shutter for preventing the invasion of wet air into the secondary zone of a ventilator/drier assembly according to the invention, illustrating how the shutter operates.

Reference numeral 71 denotes a first anti-moisture shutter arranged at the air feeding aperture 5 of the air feeding path 4 in the case main body 1. As seen from FIG. 16, this first anti-moisture shutter 71 is arranged on the side of the secondary zone 3B and its shaft 72 is carried by a bearing section 11A disposed on the fifth partition panel 11. Shutter 71 is provided with a coil spring 73 wound around the shaft 72 and having an end 73a thereof held against the shutter and the opposite end 73B held against the fifth partition panel 11 so that the shutter 71 is constantly urged to block the air feeding aperture 5 as viewed from the secondary zone 3B. The urging force of the spring 73 is selected so that it is weaker than the pressure of wet air A drawn by the blower 21 in the drying/heating mode of operation but capable of constantly blocking the air feeding aperture 5 when the ventilator/drier assembly is out of operation. With this arrangement, wet air A of the room 100 is prevented from entering the secondary zone 3B by way of the air inlet path 60A of the duct 60 and the air inlet port 2A of the case main body 1, although the anti-moisture shutter 71 is easily opened by the pressure of wet air A drawn from the room 100 by the blower 21 to take the position illustrated by broken lines in FIG. 16 when the ventilator/drier assembly is out of operation.

Figure 17:
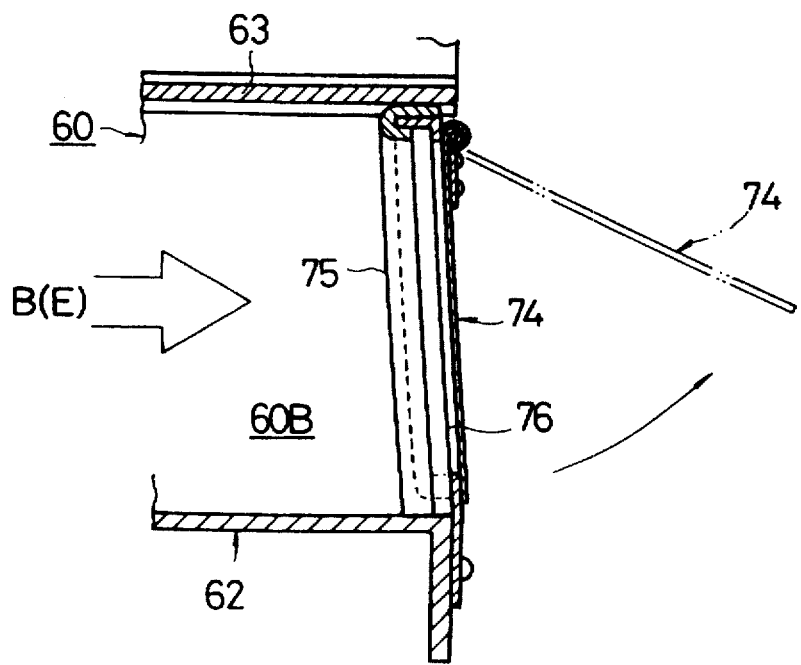
FIG. 17 is a schematic sectional side view of the anti-moisture shutter for preventing the invasion of wet air through the dry air outlet port and the duct connected thereto.
Figure 18:
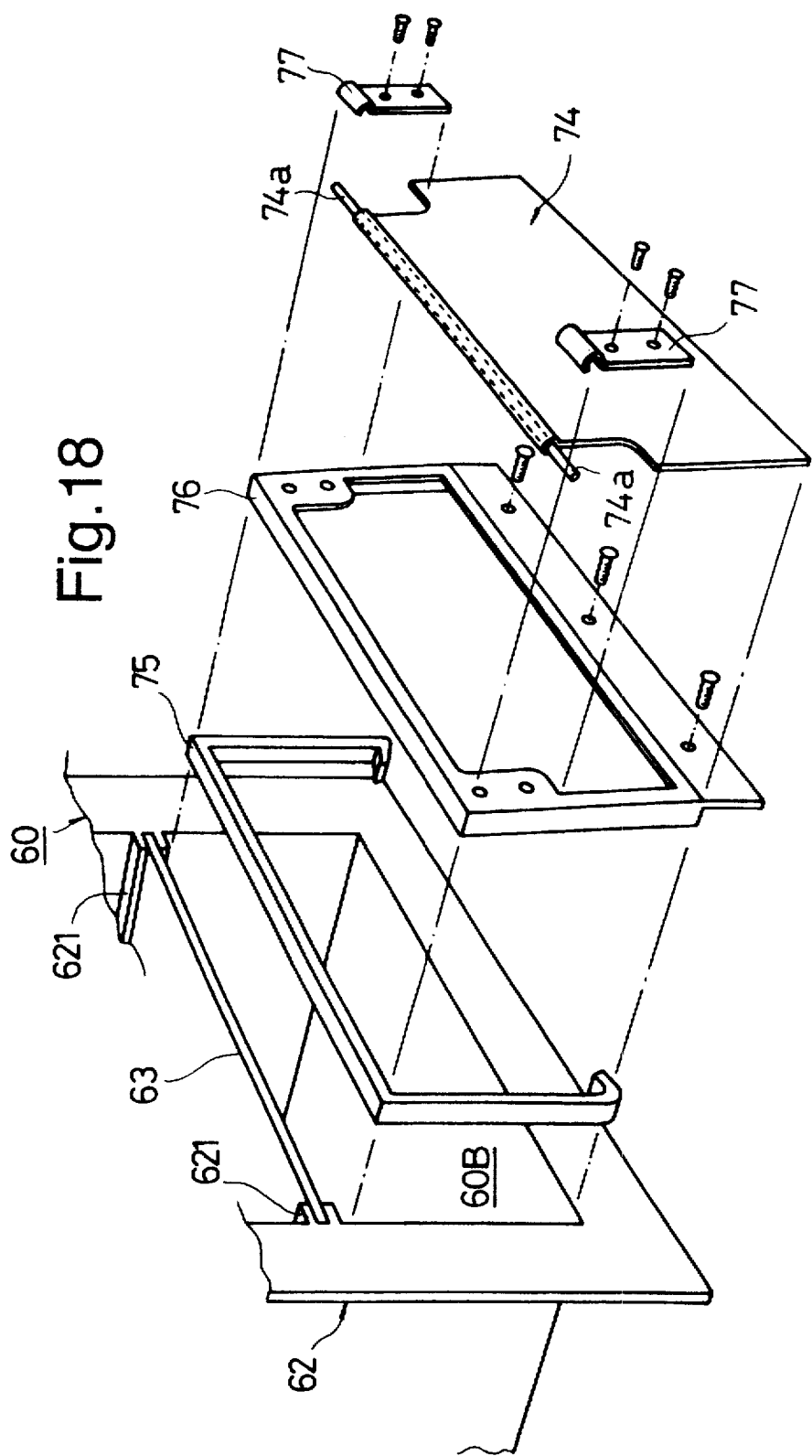
FIG. 18 is a schematic exploded perspective view of the anti-moisture shutter for preventing the invasion of wet air through the dry air outlet port and the duct connected thereto.

Reference numeral 72 denotes a second shutter arranged at an outside position corresponding to the air outlet port 2B that communicates with the tertiary zone 3C, typically at the open end of the second duct 62 wherein the air outlet path 60B of the duct 60 is formed. As seen from FIGS. 17 and 18, the second anti-moisture shutter 74 is provided with a pair of hinge pins 74a, 74a projecting respectively from the opposite ends of the upper edge thereof, which hinge pins 74a, 74a are connected to respective keep members 77, 77 applied from the outside to a frame 76 to be secured to the edge portions of the opening of the second duct 62 for the air outlet path 60B. An insulation member 75 is disposed between the duct 62 and frame 76 so that the air outlet path 60B of the duct 60 may be closed by the second shutter that hangs down due to its own weight when the ventilator/drier assembly is out of operation. Thus, the second anti-moisture shutter 74 can be opened under the pressure of dry air B or heating air E blown against it in the drying/heating mode of operation, as shown by dotted lines in FIG. 17, and closed to prevent wet air A of the room 100 from entering the tertiary zone 3C by way of the air outlet path 60B of the duct and the air outlet port 2B of the case main body 1 when the ventilator/drier assembly is out of operation.

In other words, the first and second shutters 71, 74 constantly block the air feeding aperture 5 and the air outlet path 60B of the duct 60 in order to prevent wet air A of the room 100 from entering the case main body 1 and consequently enhance the moisture removing efficiency of the rotary type moisture adsorbing device 31 when the ventilator/drier assembly is out of operation. At the same time, shutters protect electric devices and temperature control devices such as a thermostat 91 and a thermal fuse 92 and other electric elements arranged on the printed circuit board 82 in an electric box 81 housed in the case main body 1.

The electric box 81 is located in an upper portion of the quaternary zone 3D, which is an anti-moisture zone in the case main body 1. The printed circuit board 82 is suspended from the ceiling of the electric box 81 so that it may be less subject to moisture drops if moved with the case where the printed circuit board 82 is made to stand upward.

Additionally, the temperature control devices such as the thermostat 91 and the thermal fuse 92 are also arranged in an upper portion of the tertiary zone 3C, which is a drying/heating zone, so that the thermostat 91 and the thermal fuse 92 may be less subject to moisture drops.

[Advantages of the Invention]

As described above in detail, according to the invention, there is provided a ventilator/drier assembly comprising an air inlet port and an air outlet port disposed vertically side by side on the front panel of the case main body of the assembly so that wet air drawn from the room through the air inlet port is forced to pass through a rotary type moisture adsorbing device arranged in the case main body by means of a forced circulation mechanism comprising an air blowing means having a centrifugal type air blower so that the moisture contained in the air is adsorbed by the device for drying. Additionally, the ventilator/drier assembly comprises a regenerating means for causing dry air to be returned into the room via the air outlet port and hot air to pass through the rotary type moisture adsorbing device in order to take moisture out of it and a ventilation means for directly discharging air in the room to the outside. Thus, a ventilator/drier assembly according to the invention can operate for removing moisture from air and drying it by means of the rotary type moisture adsorbing device and for regenerating the rotary type moisture adsorbing device simultaneously and continuously.

Additionally, the inside of the case main body is divided into a primary zone communicating with the air inlet port, a tertiary zone communicating the air outlet port and a secondary zone disposed adjacent to the tertiary zone and the primary zone. By this arrangement air in the room is forced to flow through the air inlet port, the primary zone, the secondary zone, the tertiary zone and the air outlet port to flow back into the room by means of an air blowing unit comprising a centrifugal type air blower so that moisture contained in the air is adsorbed by a cylindrical rotary type moisture adsorbing device arranged between the secondary zone and the tertiary zone. The assembly has a very simple configuration and reduced dimensions.

Still additionally, since the ventilator/drier assembly comprises a drying/heating changeover means for leading regenerating air heated by the heat recovered by a heat recovering means into the tertiary zone and discharging it through the air outlet port, the room can be heated easily by using the changeover means to consequently enhance the drying efficiency of the assembly in the drying mode of operation. If the room is a bathroom, this feature can make the inside of the bathroom comfortably warm in winter.

The regenerating means comprises a regenerating chamber arranged in correspondence to the regenerating position and the heat recovering position of the rotary type moisture adsorbing device on the side of the tertiary zone and is divided into an air lead-in path for flowing air coming from the heat recovering position of the rotary type moisture adsorbing device and an air lead-out path for turning the air flow back to the regenerating position of the rotary type moisture adsorbing device. An electric heater is arranged in the air lead-in path to heat air coming from the heat recovering position of the rotary type moisture adsorbing device. A drying/heating changeover damper is provided to serve as a changeover damper arranged at the lateral wall of the regenerating chamber facing the tertiary zone and at the downstream side of the electric heater in order to close an air exhaust port and feed regenerating air heated by the electric heater to the tertiary zone. With this arrangement, the volume of the regenerating chamber can be minimized to downsize the entire assembly.

Still additionally, since a heating means is provided in the tertiary zone of the case main body in order to heat dry air coming form the moisture removing means and discharge it into the room, the ventilator/drier assembly has a high heating effect.

Finally, since the case main body is provided with first and second anti-moisture shutters disposed respectively at the interface of the primary zone and the secondary zone and the air outlet port, of which the first anti-moisture shutter can be opened by the pressure of wet air drawn from the room by the blower while the second anti-moisture shutter openable by the pressure of drying or heating air blown out from the air outlet port, the interface separating the primary zone and the secondary zone and the air outlet port can be constantly closed when the ventilator/drier assembly is out of operationto prevent wet air from entering into the secondary zone containing the rotary type moisture adsorbing device and the tertiary zone communicating with the air outlet port. This improves the moisture-removing efficiency of the rotary type moisture adsorbing device. At the same time, the electric elements and the temperature control devices arranged on the printed circuit board of the electric box in the case main body can be effectively protected against any adverse effects of moisture.

We claim:

1. A ventilator/dryer assembly for drying wet air comprising:

a case main body having an air inlet port and an air outlet port;

partitions in the inner space of said case main body dividing the space into a primary zone communicating at least with said air inlet port, a tertiary zone communicating with said air outlet port and a secondary zone disposed adjacent to the first and secondary zones and provided with a blowing means for drawing air from a room provided with the assembly and forcibly circulating the air to said air outlet port by way of said primary zone, said secondary zone and said tertiary zone;

a moisture-adsorbing/drying means exposed to the air passing through the secondary zone and flowing into the tertiary zone to adsorb moisture from the air and dry it, said moisture-adsorbing/drying means comprising a cylindrical rotary type moisture adsorbing device, a heat recovering means for causing part of the air flowing from said secondary zone into said tertiary zone to pass through said rotary type moisture adsorber device and recover heat therefrom;

a regenerating means comprising a regenerating chamber for causing the air subjected to heat recovery by said heat recovering means to be reheated and returned to said rotary type moisture adsorbing device to pass therethrough again;

an exhausting means for drawing the air regenerated by the regenerating means to an outside;

a ventilating means for drawing the air flowing from said primary zone to said secondary zone by way of a moisture adsorbing/drying changeover means for drawing the air recovered and heated by said heat recovering means from an exhaust port arranged in said regenerating chamber to said tertiary zone and further to the outside by way of said air outlet port; and an air feed port separating the primary zone and the secondary zone in said case main body and the air outlet port communicating with the tertiary zone being respectively provided with a first and a second anti-moisture shutter designed to close said air feed port and said air outlet port whenever the ventilator/dryer assembly is out of operation.

2. A ventilator/drier assembly according to claim 1, wherein said first anti-moisture shutter is opened by the air pressure of the wet air drawn in from the room by said air blower.

3. A ventilator/drier assembly according to claim 1, wherein said second anti-moisture shutter is opened by the air pressure of the drying or heating air blown out from air outlet port.

* * * * *